Figure 1:
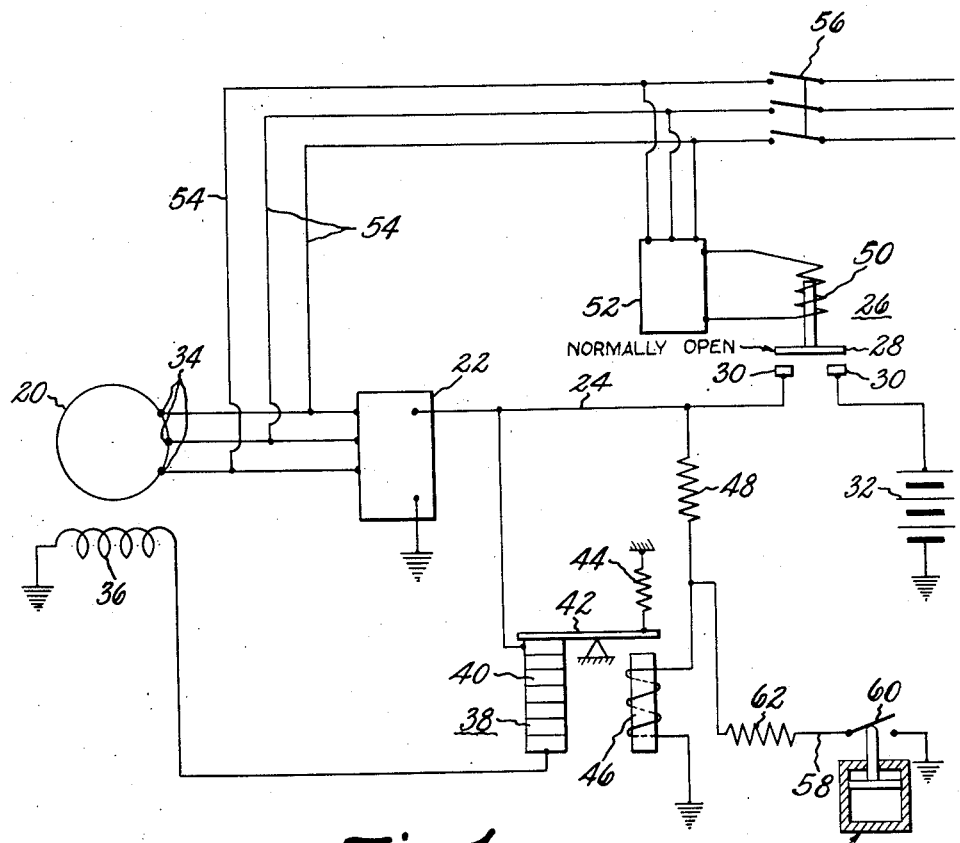

March 25, 1958

L. A. RICE 2,828,426

ELECTRIC CIRCUIT FOR MOTOR VEHICLES

Filed July 13, 1955

2 Sheets-Sheet 1

INVENTOR.
LYMAN A. RICE
BY
ATTORNEY

March 25, 1958 L. A. RICE 2,828,426
ELECTRIC CIRCUIT FOR MOTOR VEHICLES
Filed July 13, 1955 2 Sheets-Sheet 2

INVENTOR.
LYMAN A. RICE
BY
John T. Marvin
ATTORNEY

United States Patent Office 2,828,426
Patented Mar. 25, 1958

2,828,426

ELECTRIC CIRCUIT FOR MOTOR VEHICLES

Lyman A. Rice, Anderson, Ind., assignor to General Motors Corporation, Detroit, Mich., a corporation of Delaware Application July 13, 1955, Serial No. 521,791

6 Claims. (Cl. 307—10)

This invention relates to electric circuits for motor vehicles and more particularly to a battery charging circuit wherein an alternator output is used to supply an A. C. load circuit and the current to charge a storage battery.

Motor vehicles increasingly are being provided with both alternating load circuits, such as a fluorescent light load, and direct current load circuits which usually include a storage battery. These vehicles are generally provided with an alternator, driven by the vehicle prime mover, which, through a suitable rectifier, supplies the current for the storage battery and other direct current load circuits which may be present. It is to be appreciated that because of the wide range of operation of the prime mover, the rotational speeds of the alternator will vary considerably. In order to properly control the output of the variable speed alternator, the energization of the exciting field is generally controlled by suitable relays which receive their controlling energization from the direct current portions of the circuit. When the vehicle is provided with an alternating current load circuit, this circuit is generally connected directly to the load terminals of the alternator. When this connection is made, it has been found that, because of the blocking effect of the rectifier, the D. C. circuit will not be affected when the alternating current load circuit is increased during periods when the battery is fully charged; and the current to the alternator field will not be increased to compensate for the increased A. C. load.

It is the purpose, therefore, of the present invention to provide a means which will temporarily increase the energization of the alternator field and thereby increase the output of the alternator to an amount sufficient to compensate for the increased A. C. load. This purpose is accomplished by providing a suitable means which will temporarily reduce the energization of the control relay coil and thereby effect an increase in the energization of the alternator exciting field.

It is an object of the present invention to provide a normally closed switch in the circuit to the cutout or load relay of the circuit which connects the battery to the load circuit so that the battery voltage will not be impressed on the control winding of the voltage regulator when the switch is opened and the circuit to the battery is opened.

It is another object of the present invention to provide a normally open shunt circuit around the windings of voltage regulating relays in a circuit which includes an alternator, a rectifier and a battery so that the exciting current to the windings of the voltage regulating relay may be temporarily decreased to effect a temporary increased excitation of the field of the alternator.

Further objects and advantages of the present invention will be apparent from the following description, reference being had to the accompanying drawings wherein preferred embodiments of the present invention are clearly shown.

In the drawings:

Figure 1 diagrammatically shows a circuit diagram according to one embodiment of the present invention wherein a normally open switch controls a shunt circuit around the windings of a voltage regulator.

Figure 2:
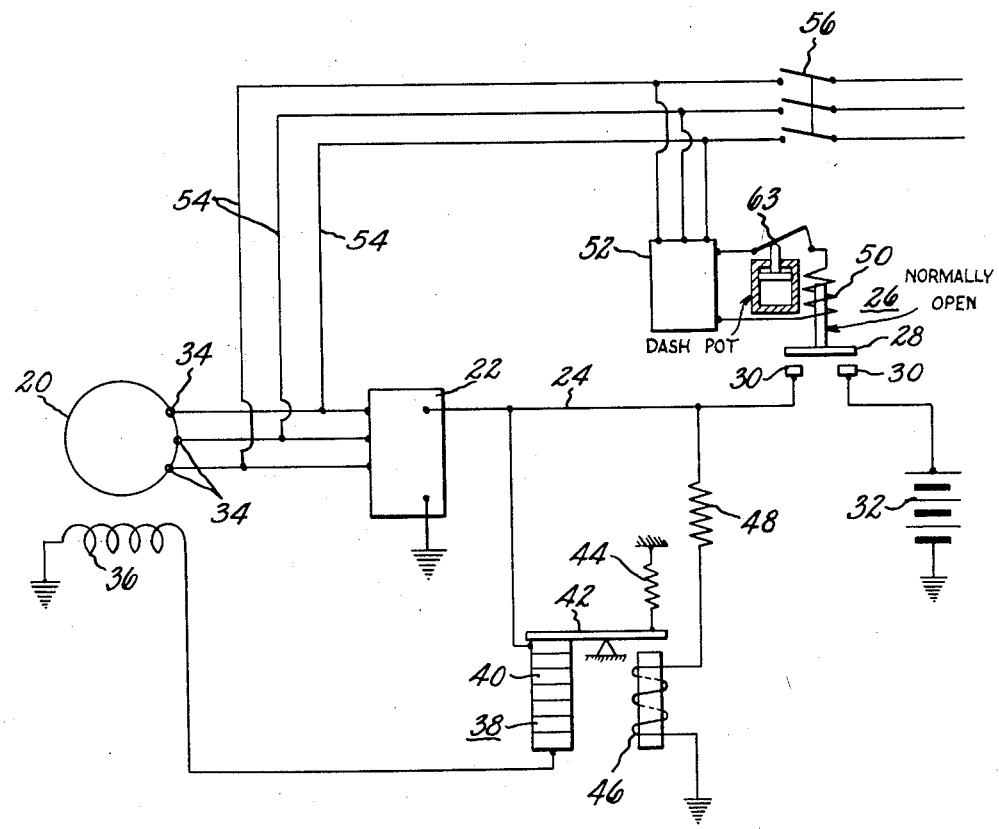

Figure 2 diagrammaticlly shows another embodiment according to the present invention wherein a normally closed switch is used to control the energization of the load or cutout relay in a battery charging circuit.

In the embodiment of the invention illustrated in Figure 1, a vehicle electrical system is shown which comprises an alternator 20 which provides current through a means or power rectifier 22 to an external direct current load circuit 24. The circuit 24 is controlled by a suitable relay 26 that has normally open contacts 28 and 30 which, when closed, completes a circuit to a storage battery 32. The alternator, here diagrammatically shown, may be of the inductor type as a three-phase alternator having Y or delta connected windings which are connected to load terminals 34. These load terminals are directly connected to the power rectifier 22, which preferably is a full three-phase bridge type of the dry plate construction, so the alernating current produced by alternator 20 is rectified or changed into direct current which is used for battery charging and other purposes.

The alternator 20 is also provided with an exciting field winding 36 which is controlled by a suitable relay means 38.

The relay 38, here shown as a carbon pile regulator, may be of the conventional vibratory type if desired. The regulating relay 38 comprises a carbon pile 40 which is connected in series with the D. C. power output side of the rectifier 22 so the direct current circuit from the rectifier is impressed on field 36. This circuit, through the carbon pile 40, is arranged so that the flow of current to field 36 from the output side of the power rectifier 22 through the pile 40 will be increased or decreased when the pressure applied by armature 42 on the carbon pile is increased or decreased, respectively. The armature 42 is normally urged by a spring 44 so that the pressure on the pile is at a maximum when no current is flowing through the relay 38 of magnet coil 46. The coil 46 is energized through a conventional current limiting resistance 48 and is connected between the power rectifier 22 and the contacts 30 of cutout relay 26 so that it is responsive to the voltage in circuit 24. Thus, as the voltage in circuit 24 is increased, the energization of the magnet coil 46 is increased and the force of the spring 44 on the carbon pile 40 is decreased so that the current to field 36 is decreased and the output of the alternator 20 is reduced.

As heretofore stated, the circuit 24 is controlled by relay 26. This relay 26 has an actuating coil 50 connected through a relay rectifier 52 to the load terminals 34 of the alternator through the alternating current circuit leads or means 54. The rectifier 52 may also be of any suitable type and is preferably of the full three-phase bridge type of the dry plate construction and will supply rectified current to the coil winding 50 to cause the contacts 28 and 30 of relay 26 to be closed whenever the alternator 20 is supplying a current and voltage to load terminals 34. From the above arrangement of parts, it is evident that when alternator 20 initially produces a current and voltage, the relay rectifier 52 will supply an energizing current to winding 26 so that contacts 28 and 30 close and the circuit between the power rectifier 22 and battery 32 is completed. When this condition occurs, the alternator output will be controlled by the control relay 38 which is responsive to the voltage of the direct current circuit 24. Thus, when battery 32 is fully charged, the excitation of field 36 will be held to a minimum by the carbon pile 40. When the switch 56 in the circuit leads 54 is closed to complete the alternating current circuit, such as a bank of fluorescent lights, the direct current circuit 24 will continue to exercise its control on relay 38 and an insufficient alternating current voltage will be supplied to the alternating current circuit. This result will occur as the full battery voltage will be imposed across the regulator 38 as the power rectifier will permit the flow of current in one direction only and will not permit the D. C. current to be superimposed on the A. C. current to the alternating current load.

To overcome the above deficiencies, a normally open shunt circuit means 58 is provided. This shunt circuit is provided with a normally open switch 60 which, when closed, will place a resistance 62 in parallel with the energizing winding 46 of the relay 38. When switch 56 is closed to complete the circuit to the alternating current voltage, the switch 60 is also temporarily closed to close shunt circuit 58. The closing of the shunt circuit 58 will bypass a portion of the energizing current around the winding 46 and lower the magnetic effect thereof on armature 42 so that the pressure on the carbon pile 40 is temporarily increased. This increase of pressure on pile 40 will cause the energization of the field 36 to be temporarily increased. The output of the alternator will likewise be increased and the alternating current load will be supplied with current of the proper voltage. In this connection, it is to be noted that the shunt circuit 58 is closed for only a short period of time by switch 60. The switch is returned to its normal open position after the alternator output has been increased to properly supply the alternating current load circuit. During this period when the switch 60 is closed, the direct current circuit will be unaffected by the increased output of the alternator. In this connection, it is to be noted that the switch 60 is maintained closed only for a time sufficient to increase the output of alternator 20 to an amount sufficient to supply the load requirements without damaging the other components of the electrical systems. This may best be accomplished by proper calibration of a switch if switch 60 is made to function automatically as by using a time delay device such as an A. C. heated bimetallic plate, a dashpot, etc., as are all well known to those skilled in the art.

In the embodiment shown in Figure 2, the alternator 20, the rectifier 22, the direct current load circuit 24, the relay 26 with its contacts 28 and 30, the battery 32, the load terminals 34, the field 36, the carbon pile relay 38 with its pile 40, armature 42, spring 44, coil winding 46, the resistance 48, the relay winding 50, the relay rectifier 52, the A. C. load leads 54 and the switch 56 are connected in circuit and have like numerals as the parts in circuits indicated for the embodiment shown in Figure 1.

In the embodiment shown in Figure 2, a normally closed switch 63 is provided in the circuit between the D. C. output terminals of the rectifier 52 and the winding 50 which, when energized, closes the contacts 28 and 30 of the cutout relay 26. In this embodiment, when the load switch 56 is closed, the switch 63 is temporarily opened so that the energizing current to winding 50 ceases and the relay 26 causes the circuit from the battery 32 to the winding 46 of the regulating relay 38 to be broken. When this occurs, because of the increased load applied to the alternator 20, the voltage to the D. C. current load means 24 will be reduced and the pressure applied by the armature 42 of relay 38 on the carbon pile will be increased. This increase of pressure on the carbon pile 40 of relay 38 will increase the energizing current to field 36 to cause a corresponding increase in alternator output. When the alternator output has increased sufficiently to satisfy both the direct and alternating current load requirements, the voltage of the direct current circuit means 24 rises to cause a sufficient energization of winding 46 so that the relay 38 will properly control the energization of field 36 and limit the output of the alternator to a value that will not injure the electrical components of the system. In this connection, it is to be noted that switch 63 is maintained open only for a time sufficient to increase the output of the alternator 20 to an amount sufficient to supply the load requirements. This may best be accomplished by providing a time delay switch which is properly calibrated. A device of this type may be an A. C. heated bimetallic switch or a switch having a dashpot such as are all well known to those skilled in the art.

While the embodiments of the present invention as herein disclosed constitute preferred forms, it is to be understood that other forms might be adopted.

What is claimed is as follows:

1. In an electrical system for a motor vehicle having both an A. C. and a D. C. load including a storage battery, an alternator having a field winding and load terminals, a first circuit means including a switch for connecting said A. C. load directly with said load terminals, a full wave rectifier, a second circuit means connecting said D. C. load and battery through said rectifier to said load terminals, a relay means energized from said first A. C. circuit means having normally open series switch contacts in said second D. C. circuit means adapted to close said second circuit means in response to the energization of said first circuit means, a second relay means having a magnetic coil energized from said D. C. load circuit and battery, said second relay means connected with said field winding for varying the energization of the latter in response to the energization of said second circuit means and storage battery, and a third means including a switch means for reducing the energization of said magnetic coil for increasing the energization of said field when the switch means in said A. C. load circuit is closed.

2. In an electrical system for a motor vehicle having both an A. C. and D. C. load including a storage battery, an alternator having a field winding and load terminals, a first circuit means connecting said A. C. load directly to said load terminals, a full wave main rectifier, a second circuit means connecting said D. C. load and battery through said main rectifier to said load terminals; an auxiliary rectifier, a relay means having a magnetic winding and normally open switch contact in said second circuit means, said winding being connected through said auxiliary rectifier with said first circuit means and adapted to close said second circuit means in response to the energization of said first circuit means, a second relay means connected with said field winding and having a magnetic winding connected with said second circuit means for varying the energization of said field in response to the energization of said winding by said second circuit means, and a normally open shunt in circuit with the magnetic winding of said second relay, said shunt circuit when closed being adapted to bypass at least a portion of energization from said second circuit means to said second relay coil winding for increasing the energization of said field when an A. C. load is imposed on said load terminals.

3. In an electrical system for a motor vehicle having both an A. C. and D. C. load including a storage battery, an alternator having a field winding and load terminals, a first circuit means connecting said A. C. load directly with said load terminals, a main rectifier, a second circuit means connecting said D. C. load and storage battery through said rectifier with said load terminals, an auxiliary rectifier, a relay means having normally open switch contacts in said second circuit means between said battery and main rectifier and having a magnetic coil adapted, when energized, to move said switch contacts to a closed position, a third circuit means connecting said magnet coil with said first circuit means through said auxiliary rectifier for energizing said magnetic coil in response to the energization of said first circuit means, a second voltage responsive relay means operably connected with said field winding and said second circuit means between the switch contacts and rectifier for controlling the energization of said field in response to the voltage of said second circuit means, and a normally closed switch in said third circuit means circuit arranged for opening said circuit means to said magnet coil for causing the same to be deenergized and the switch contacts in said second circuit means open and said battery to be disconnected from the coil winding of said voltage responsive relay whereby the energization of said field is increased when the A. C. load is increased and said normally closed switch is opened.

4. In an electrical system for a motor vehicle having a variable A. C. load and a storage battery which provides both a D. C. load and voltage source, an alternator having a field winding and load terminals providing an A. C. voltage source, a main rectifier, circuit means connecting said battery through said rectifier to said load terminals having the voltages of both A. C. and D. C. sources impressed thereon, an auxiliary rectifier, a relay means having normally open switch contacts between said main rectifier and battery and having a magnet coil adapted when energized to move said contacts to a circuit closing position, a second circuit means connecting said magnet coil through said auxiliary rectifier with said load terminals for effecting an energization of said coil in response to the operation of said alternator, a second relay means operably connected with said field winding and said first circuit means between said switch contacts and main rectifier, said second relay means being adapted to vary the energization of said field inversely in response to the voltages of said first circuit means, and a switch in said second circuit means for opening the energizing circuit between said coil and load terminals for momentarily opening said first circuit to said battery when the A. C. voltage load on said alternator is increased whereby the second relay is momentarily responsive only to the voltage of said load terminals and causes the energization of the field of the alternator to be increased after said first load circuit is closed.

5. In an electrical system for a motor vehicle having a variable A. C. load and a storage battery providing a D. C. load and voltage source, an alternator having a field winding and load terminals providing an A. C. voltage source, a main rectifier, circuit means connecting said battery through said rectifier to said load terminals, said circuit means having the voltages of both the A. C. and D. C. sources impressed thereon, a relay means operably connected in circuit with said field winding and having a magnet coil in circuit with said circuit means, said relay being circuited and arranged to vary the energization of said field inversely in response to voltage impressed on said coil by said circuit means, and means for momentarily reducing the voltage impressed on said coil by said circuit means for effecting an increased energization of said alternator field winding.

6. In an electrical system for a motor vehicle having a variable A. C. load and a storage battery providing a D. C. load and voltage source, an alternator having a field winding and load terminals providing an A. C. voltage source, a main rectifier, circuit means connecting said battery through said rectifier to said load terminals, said circuit means having the voltages of both the A. C. and D. C. sources impressed thereon, a relay means operably connected in circuit with said field winding and having a magnet coil in circuit with said circuit means, said relay being circuited and arranged to vary the energization of said field inversely in response to voltage impressed on said coil by said circuit means, and means including a switch and a resistance for momentarily reducing the voltage impressed on said coil by said circuit means for effecting an increased energization of said alternator field winding.

References Cited in the file of this patent

UNITED STATES PATENTS

| 1,680,149 | Gould | Aug. 7, 1928 |

FOREIGN PATENTS

| 589,167 | Germany | Dec. 4, 1933 |
| 479,944 | Canada | Jan. 1, 1952 |

OTHER REFERENCES

Electrical Engineering, August 1947, pp. 779 and 780, by Gilchrist.